United States Patent [19]

Song et al.

[11] Patent Number: 5,128,155
[45] Date of Patent: Jul. 7, 1992

[54] FLAVOR RELEASING STRUCTURES FOR CHEWING GUM

[75] Inventors: Joo H. Song, Northbrook; Steven B. Courtright, Evanston, both of Ill.

[73] Assignee: Wm. Wrigley Jr. Company, Chicago, Ill.

[21] Appl. No.: 630,839

[22] Filed: Dec. 20, 1990

[51] Int. Cl.$^5$ ............................................. A23G 3/30
[52] U.S. Cl. ..................................... 426/5; 426/96; 426/516; 426/453; 424/48
[58] Field of Search .................. 426/3, 4, 5, 6, 96, 426/99, 516, 517, 453; 252/316; 424/24, 20

[56] References Cited

U.S. PATENT DOCUMENTS

| | | | |
|---|---|---|---|
| 3,028,308 | 4/1962 | Zambito et al. | 167/82 |
| 3,201,353 | 8/1965 | Corben | 252/316 |
| 3,329,574 | 7/1967 | Barron et al. | 167/82 |
| 3,435,110 | 3/1969 | Nichols | 424/20 |
| 3,737,521 | 6/1973 | Born | 424/22 |
| 3,795,744 | 3/1974 | Ogawa et al. | 426/3 |
| 3,818,107 | 6/1974 | Yolles | 426/3 |
| 3,923,939 | 12/1975 | Baker et al. | 264/49 |
| 3,928,633 | 12/1975 | Shoat et al. | 426/96 |
| 3,951,821 | 4/1976 | Davidson | 252/1 |
| 4,122,195 | 10/1978 | Bahoshy et al. | 426/3 |
| 4,125,519 | 11/1978 | Goodman et al. | 528/363 |
| 4,139,639 | 2/1979 | Bahoshy et al. | 426/3 |
| 4,206,301 | 6/1980 | Yolles | 536/3 |
| 4,230,687 | 10/1980 | Sair et al. | 424/22 |
| 4,374,858 | 2/1983 | Glass et al. | 426/5 |
| 4,384,004 | 5/1983 | Cea et al. | 426/3 |
| 4,384,005 | 5/1983 | McSweeney | 426/250 |
| 4,386,106 | 5/1983 | Merritt et al. | 426/5 |
| 4,388,328 | 6/1983 | Glass | 426/3 |
| 4,447,475 | 5/1984 | Lubbock et al. | 427/213.31 |
| 4,485,118 | 11/1984 | Carroll et al. | 426/5 |
| 4,496,592 | 1/1985 | Kuwahara et al. | 426/5 |
| 4,515,769 | 5/1985 | Merritt et al. | 424/49 |
| 4,568,560 | 2/1986 | Schobel | 427/3 |
| 4,590,075 | 5/1986 | Wei et al. | 426/5 |
| 4,606,940 | 8/1986 | Frank et al. | 427/213.32 |
| 4,634,593 | 1/1987 | Stroz et al. | 426/5 |
| 4,673,565 | 6/1987 | DiLuccio et al. | 424/443 |
| 4,673,577 | 6/1987 | Patel | 426/5 |
| 4,690,825 | 9/1987 | Won | 424/501 |
| 4,695,463 | 9/1987 | Yang et al. | 424/440 |
| 4,711,784 | 12/1987 | Yang | 426/99 |
| 4,720,384 | 1/1988 | DiLuccio et al. | 424/78 |
| 4,722,845 | 2/1988 | Cherukuri et al. | 426/5 |
| 4,726,953 | 2/1988 | Carroll et al. | 426/5 |
| 4,740,376 | 4/1988 | Yang | 426/5 |
| 4,752,485 | 6/1988 | Sharma et al. | 426/99 |
| 4,766,036 | 8/1988 | Vaughn et al. | 428/364 |
| 4,816,265 | 3/1989 | Cherukuri et al. | 426/5 |
| 4,824,681 | 4/1989 | Schobel et al. | 426/5 |
| 4,828,857 | 5/1989 | Sharma et al. | 426/99 |
| 4,841,968 | 6/1989 | Dunn et al. | 128/335.5 |
| 4,873,085 | 10/1989 | Fuisz | 424/400 |
| 4,885,175 | 12/1989 | Zibell | 426/99 |
| 4,892,736 | 1/1990 | Goodson | 424/435 |
| 4,911,934 | 3/1990 | Yang et al. | 426/5 |
| 4,929,447 | 5/1990 | Yang | 424/440 |
| 4,933,190 | 6/1990 | Cherukuri et al. | 426/5 |
| 4,978,537 | 12/1990 | Song | 426/548 |

FOREIGN PATENT DOCUMENTS

| | | |
|---|---|---|
| 0040048 | 11/1981 | European Pat. Off. |
| 252374 | 1/1988 | European Pat. Off. |
| 0263224 | 4/1988 | European Pat. Off. |
| 273009 | 6/1988 | European Pat. Off. |
| 288909 | 11/1988 | European Pat. Off. |
| WO85/03414 | 8/1985 | PCT Int'l Appl. |
| WO88/08298 | 11/1988 | PCT Int'l Appl. |
| WO88/02703 | 4/1989 | PCT Int'l Appl. |
| 1327761 | 8/1973 | United Kingdom . |

OTHER PUBLICATIONS

F. Billmeyer, Jr., Textbook of Polymer Science, 518-22 (Wiley International Edition, 2nd).

*Primary Examiner*—Jeanette Hunter
*Attorney, Agent, or Firm*—Willian Brinks Olds Hofer Gilson & Lione

[57] ABSTRACT

Flavor releasing structures for chewing gum are provided. The structures consist of a core having a flavor reservoir material and a binding material. The cores may be coated with a flavor barrier coating.

15 Claims, 2 Drawing Sheets

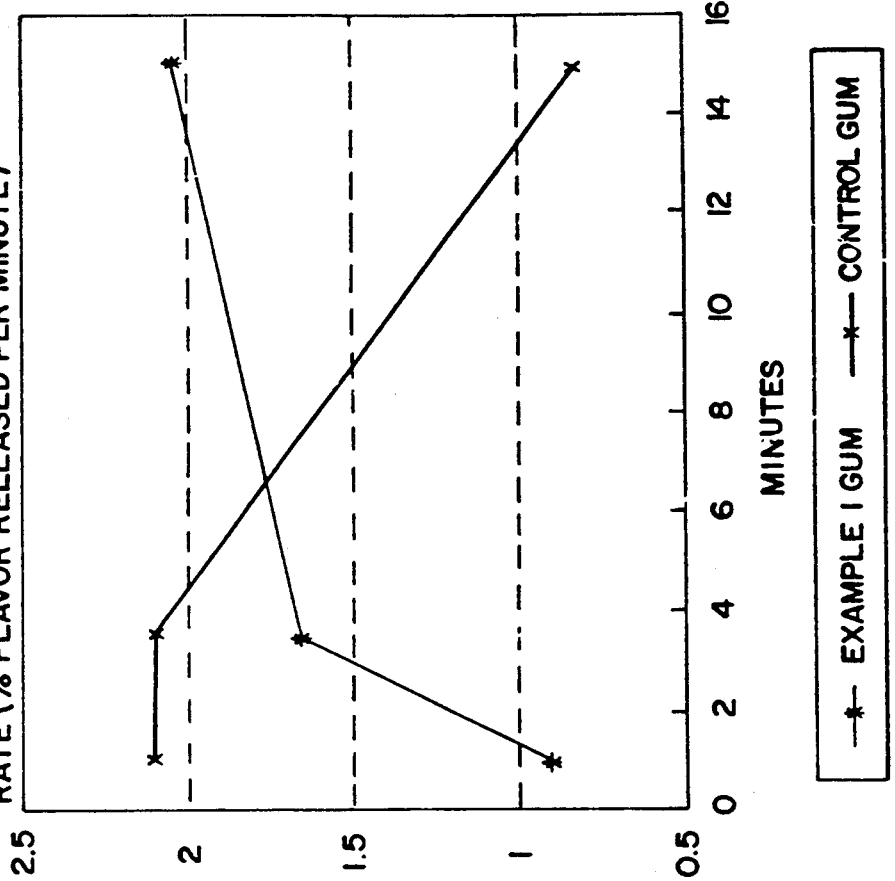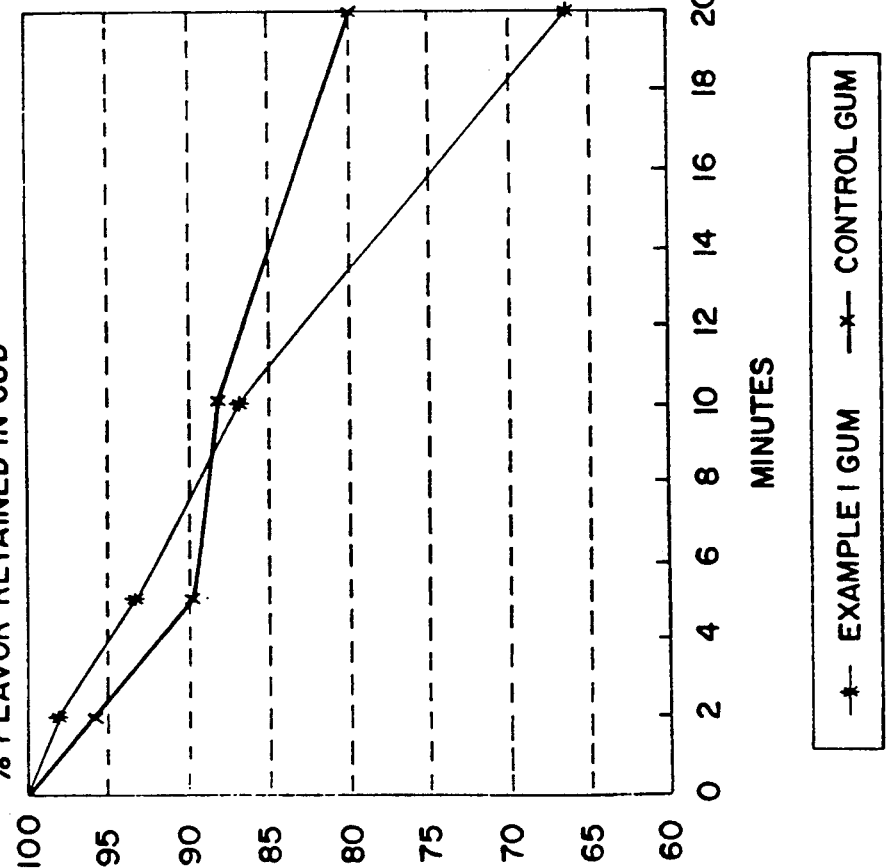

FLAVOR RELEASING STRUCTURES FOR CHEWING GUM

FIELD OF THE INVENTION

The invention relates to flavor releasing structures for use in chewing gums. More particularly, the present invention relates to flavor-releasing structures for chewing gums that have at least one non-thermoplastic material and at least one thermoplastic or thermosetting material.

BACKGROUND OF THE INVENTION

The present invention is an advance in the art of structures for use in chewing gums that gradually release a flavoring agent while the gum is chewed. These structures can provide improved flavor releasing characteristics during the latter portions of chewing and can provide greater flavor recovery than conventional means of delivering flavoring agents. Normally, gum containing a flavoring agent will exhibit a very strong rapid flavor release in the beginning periods of chewing. After this initial flavor release, the flavor release dramatically decreases. The structures embodying the present invention can provide a large flavor release during the later periods of chewing, when the conventional gum's flavor release has diminished. Additionally, by varying the composition of the flavor releasing structure different flavor release characteristics can be obtained.

SUMMARY OF THE INVENTION

A chewing gum having flavor releasing structures is provided. The gum comprises a gum base, a water soluble bulk portion, and a flavor releasing structure. The flavor releasing structure comprises a flavor reservoir material, which can be a non-thermoplastic material and a binding material which can be a thermoplastic, thermosetting material or the combination of both. These materials form the core of the flavor releasing structure. The flavor reservoir material is dispersed in the binding material and is bound by it. At least one of the materials releasably retains a flavoring agent.

BRIEF DESCRIPTION OF THE DRAWINGS

FIG. 1 is a graph plotting the % flavoring agent retained in a gum cud against the minutes of chewing for an embodiment of the present invention and a control gum.

FIG. 1a is a graph plotting the rate of flavor release (% of flavor released per minute of chewing) against minutes of chewing for an embodiment of the present invention and a control gum.

DETAILED DESCRIPTION OF THE PRESENTLY PREFERRED EMBODIMENT OF THE INVENTION

Figure 2A:
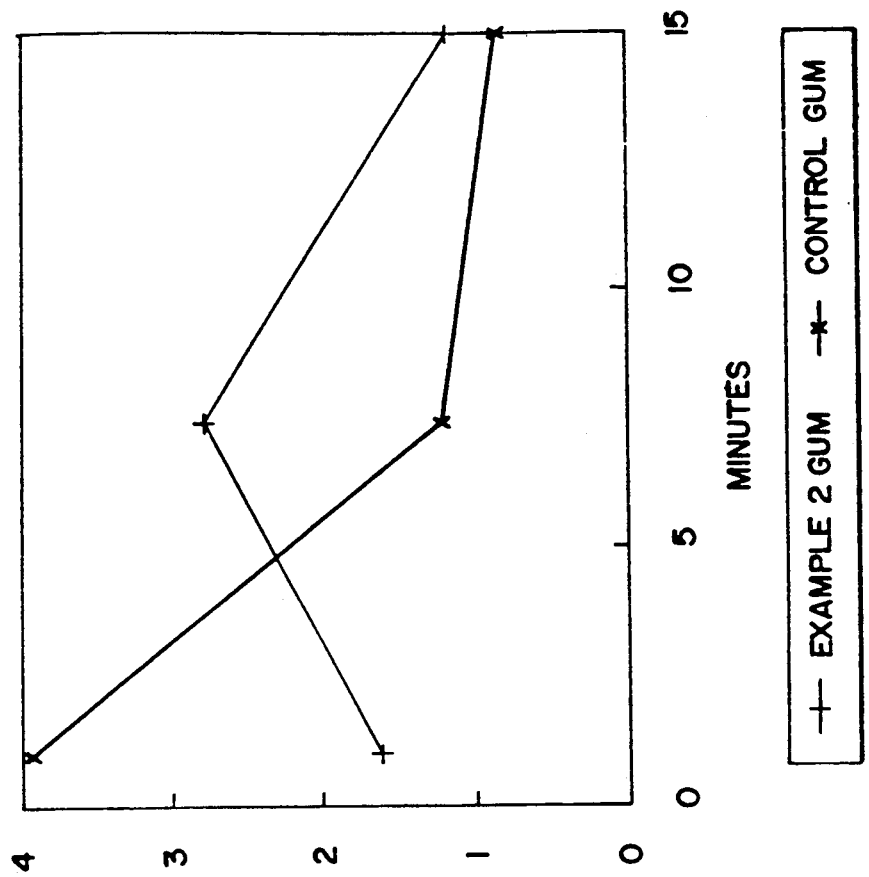
FIG. 2a is a graph plotting the rate of flavor release (% of flavor released per minute of chewing) against minutes of chewing for an embodiment of the present invention and a control gum.

An embodiment of a structure made in accordance with the present invention is a gum having flavor releasing structures made by extruding mixtures of materials. The flavor releasing structures have at least two materials that form a core of the structure. These materials have different properties.

One of the support materials can be a thermoplastic. This material will deform or melt, becoming flowable at the temperatures and pressures used in the extruder. At least one of the other materials is a flavor reservoir material. This material is a non-thermoplastic, to the extent that it will not deform or melt at the temperatures and pressures used in the extruder. In a process used to make the cores, the thermoplastic and non-thermoplastic materials are mixed together and added to a hopper which feeds the extruder. The increased temperature and pressure within the extruder cause the thermoplastic material to become flowable. Once the mixture has become flowable it is then forced through a die to form an extrudate. The extrudate should be cooled immediately after extrusion. This can be accomplished by collecting the extrudate on a stainless steel belt conveyor with chilling capabilities. The extrudate is then ground and sieved if needed, to provide cores of a desired size.

Various proportions of thermoplastic and non-thermoplastic materials can be used. Normally, when using a cellulosic material and silica a maximum of 40% silica (based on the total weight of the mixture) can be used. A loading as high as 60% silica is possible when using teflon.

In addition to extrusion other processes can be used to form the cores. For example, the materials can be combined in a heated pressure vessel, heated to a temperature at which the thermoplastic becomes flowable and mixed. Upon cooling, the resulting material can be ground and sieved if needed to provide cores of a desired size.

Grinding can be accomplished by means known to the art. For example a Mikropul or Fitzmill mill can be used. On large scale operations, where heat build may become a concern, cryogenic grinding can be used. Environmental exposure of the extrudate to high humidity before or after grinding may reduce the cores ability to hold flavoring agent and may increase handling difficulties.

The cores have at least two matrices. One matrix is comprised of the non-thermoplastic material and the other matrix is comprised of the thermoplastic material. The non-thermoplastic matrix is dispersed throughout the thermoplastic matrix. The thermoplastic material functions as a binding material for the non-thermoplastic material in the core. The thermoplastic material forms a matrix larger than the non-thermoplastic material and supports and incorporates the non-thermoplastic material. Thus, the non-thermoplastic material may be enclosed in the thermoplastic material to varying degrees. Some of the non-thermoplastic material may be completely enclosed in the thermoplastic material, some may only be partially enclosed in the thermoplastic material and some may be substantially unenclosed in the thermoplastic material.

In addition to the two materials having different thermoplastic properties, they also can differ in their water solubility (how quickly they will dissolve in water). This difference may effect the release rate of the flavoring agent. The non-thermoplastic material should be essentially water insoluble. For example, silica can be used as the non-thermoplastic support material. On the other hand, the thermoplastic material should be water soluble or water swellable, but should have a relatively slow rate of dissolution. The water solubility of these materials will have an effect on the release rate of the flavoring agent. Generally, all other factors remaining the same, the higher the water solubility of the non-thermoplastic material the faster the release rate of the flavoring agent.

Cellulosic materials are preferred as the thermoplastic material. For example, cellulose 2-hydroxypropyl ether, which is called hydroxypropylcellulose, is particularly preferred. Hydroxypropylcellulose is sold by Aqualon Co., a subsidiary of Hercules Inc., under the trademark Klucel ®. Hydroxypropylcellulose is available in different molecular weights. Varying the molecular weight may affect the release characteristics of the cores. For example, Klucel HF has a molecular weight of 1,500,000 and Klucel EF has a molecular weight of 80,000. Another example of a cellulosic thermoplastic support material is hydroxypropyl hydroxyethylcellulose. This product is sold by Aqualon Co. under the trademark Natrovis ®. In addition to cellulosic materials carbohydrates may also be used as the thermoplastic material. One aspect to consider in choosing a thermoplastic material is the degree to which the flavoring agent may plasticize the thermoplastic. If too much plasticization takes place the cores could become difficult to process.

Thermosetting materials may also be used as one of the support materials in combination with or in place of the thermoplastic material. When using a thermosetting material it may be necessary to add water (or some other plasticizer) to enable the material to be extruded. If water is added to the mixture during the extrusion process the water may be retained by the non-thermoplastic material. For some non-thermoplastic hydrophilic materials this retained water may interfere with the retention of the flavoring agent by that material. Other non-thermoplastic hydrophilic materials, such as synthetic microsponges, will not be adversely affected by the retained water. To prevent these problems from occurring with the non-thermoplastic materials that are adversely affected by the retained water, an additional step of removing that water must be employed. The water may be flashed off (evaporated) during the extrusion process, if not the water removal can be accomplished, for example, by vacuum drying. One such thermosetting material that would require vacuum drying is carboxymethyl cellulose.

The non-thermoplastic material must be capable of absorbing, adsorbing, retaining or serving as a reservoir for, the flavoring agent. Nevertheless, the ability to retain the flavoring agent should not be so great that this material will not release the flavoring agent when chewed in a gum. This can be accomplished by several types of materials. For example, the non-thermoplastic material can consist of small particles with microporous structures, it can consist of the compositions disclosed in U.S. Pat. No. 4,497,832, it can consist of small particles with very high surface areas or it can contain a combination of any of these types of materials or properties. During processing the non-thermoplastic material should not lose its ability to releasably retain the flavoring agent.

Examples of materials that can be used as flavor reservoir materials are: silicas such as, synthetic amorphous silica dioxide hydrate which, is supplied by Degussa Corp. under the tradename Sipernat 22, 225, 50 and 503, and is also supplied by Cabot Corp. under the tradename Cab-O-Sil (EM5); microsponges such as those supplied by Advanced Polymer Systems, Co.; zeolites; carbon black; and rubber particles either cross linked or not.

Either hydrophilic or hydrophobic non-thermoplastic materials can be used. For example, flavor releasing structures were made with both hydrophilic silica and hydrophobic silica. The water affinity of the non-thermoplastic, however, affects the release rate of the flavor, all other factors being equal. The greater the water affinity the greater the release rate.

The flavoring agent can be added to the cores before, during or after their formation. When the flavoring agent is added before extrusion, however, care must be taken to keep the temperatures low enough to prevent the degradation of the flavoring agent. The success of these various orders of addition will depend on several factors including the results sought to be obtained, the process conditions under which the core is formed, the materials used, and the flavoring agents used.

The flavoring agent can be added after formation by soaking the cores in a beaker of flavoring agent. Another method of adding flavoring agent is by misting the flavoring agent over the cores. Although these methods will work, it is preferred to obtain as homogeneous a distribution of the flavoring agent in the cores as is possible. One such way to obtain a homogeneous distribution is by using a Vee mixer. The Vee mixer has nozzles that mists the flavoring agent over the cores as they are tumbled. Vee mixers can be obtained from Patterson Industries (Canada) Limited. A Cone Shell Blender is another type of mixer that will achieve the desired uniform distribution of flavoring agent in the core. Although in most cases the flavoring agent will be absorbed into the cores very rapidly, it is desirable to allow the cores to mix for a sufficient time to reach equilibrium.

The flavoring agent is releasably retained by the cores, to the extent that it is released when gum containing the flavor releasing structures is chewed. Both the thermoplastic matrix and the non-thermoplastic matrix can releasably retain the flavoring agent. Additionally, different and multiple flavoring agents may be used in a single core. The cores can contain very large amounts of flavoring agent. For example, cores have been made that contained as much as 40 to 60% flavoring agent based on the total weight of the core. Higher loadings are obtained when the flavoring agent is added to the core after it is formed then when the flavoring agent is added during formation. Although 33% loading, based on the total weight of the core is presently preferred. The higher the loading the faster the flavoring agent will be released from the core, all other factors being equal.

Flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring agents are also contemplated. Those skilled in the art will recognize that natural and artificial flavoring agents may be combined in any sensorially acceptable blend. All such flavors and flavor blends are contemplated by the present invention, including by way of example, peppermint, spearmint, wintergreen, orange, blueberry, grape, strawberry, raspberry, lime, lemon, cherry, citrus, apple, pear, peach, plum, cola, licorice, cinnamon, menthol, clove, nut, vanilla, anise, bay, and eucalyptus. Flavoring agents are commercially available for example, from Dragoco Inc., Firmenich Incorporated, Food Materials Corp., Fries & Fries, Fritzsche-Dodge & Olicott, Gijaudan Corp., Haarman & Reimer Corp., International Flavors & Fragrance, and Kalsec.

Once the flavoring agent is retained in the core, the core can be coated with a flavor barrier coating. The coating increases the shelf life of the flavor releasing structure when it is incorporated into a chewing gum. The coating also aids in handling and processing the cores by preventing the flavor from evaporating. The coating can prevent the flavor from migrating into the gum and can protect chemically sensitive flavoring agents from reacting with the ingredients of the gum. The coating can also affect the release rate of the flavoring agent.

Generally, any natural or synthetic material that exhibits a flavor barrier characteristic can be used for the coating. Coating materials that have a high affinity for the flavoring agent are less desirable because they may draw the flavoring agent out of the core. Inert materials and hydrophilic materials are preferred for the coating. For example, the coating can be: waxes such as the following that are sold by Petrolite Corp., Ultraflex, Victory, Be Square 175, Be Square 185, Be Square 195, Starwax 100, Petrolite L-700, Petrolite L-1030, and Mekon White; polymer and wax combinations such as the following that are sold by Petrolite Corp., Polywax 500, 655, 1000, and 2000; synthetic polymers, such as the following that are sold by Petrolite Corp., Petrolite C-4040, CP-7, CP-11, CP-12 and Vybar 825, 260, 253, 103, 373; hydrophilic materials such as sugar, gelatins, gum orabic, algamate, chitosan, corn syrup, starch, cellulose (methyl-cellulose), carrageenan, polyvinyl prolidone, polyvinyl alcohol, and ethylene vinyl alcohol copolymers (such as EVAL, which is a trade name of Evalca Co.); polyvinyl acetates; and polyethylene. The cores can be coated once or multiple times with the same coating material or successively with different coating materials.

When choosing waxes as coatings, the higher melting point waxes such as Starwax 100 exhibit superior flavor barrier characteristics to lower melting point waxes. Generally, any paraffin based wax with a melting point range of about 135°–200° F. can be useful as a coating.

The coating can be added by a rotating disk coater, by a fluidized bed coater, spray chilling or by a tumbler. If the cores stick together prior to coating silica can be added to break them apart. Once the cores have been coated it may be necessary to further sieve the material to remove any agglomerated coating material or to further size the cores for use in a gum.

Once the flavor releasing structure has been formed, it is then incorporated into a chewing gum. Addition to the gum mixer during the last stage of the mixing cycle is preferred to minimize any damage to the flavor releasing structures. If a wax coating is used, the wax may change the texture of the gum requiring modification of the gum base or formula.

Chewing gum consists of a gum base to which a water soluble bulk portion may normally be added. Chewing gum bases generally comprise a combination of elastomers and resins together with plasticizers and inorganic fillers.

The gum base may contain natural gums and/or synthetic elastomers and resins. Natural gums include both elastomers and resins. Suitable natural gums include, but are not limited to chicle, jellutong, sorva, nispero tunu, niger gutta, massaranduba belata, and chiquibul.

When no natural gums are used, the gum base is referred to as "synthetic" and the natural gums are replaced with synthetic elastomers and resins. Synthetic elastomers may include polyisoprene, polyisobutylene, isobutylene-isoprene copolymer, styrene butadiene rubber, a copolymer form Exxon Corp. under the designation "butyl rubber," and the like.

The amount of elastomer used in the gum base can typically be varied between about 10 and about 20 percent depending on the specific elastomer selected and on the physical properties desired in the final gum base. For example, the viscosity, softening point, and elasticity can be varied.

Resins used in gum bases may include polyvinylacetate, polyethylene, ester gums, (resin esters of glycerol), polyvinylacetate polyethylene copolymers, polyvinylacetate polyvinyl laureate copolymers, and polyterpenes. Additionally, a polyvinylacetate obtained from Monsanto under the designation "Gelva" and a polyterpene obtained from Hercules under the designation "Piccolyte" may be used.

As with the elastomer, the amount of resin used in the gum base can be varied depending on the particular resin selected and on the physical properties desired in the final gum base.

Preferably, the gum base also includes plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba. Additionally, mixtures of the plasticizers may be used such as a mixture of paraffin wax, partially hydrogenated vegetable oil, and glycerol monostearate.

Preferably, the gum base also includes a filler component. The filler component is preferably selected from the group consisting of calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Further, gum bases may also contain optional ingredients such as antioxidants, colors, and emulsifiers.

These ingredients of the gum base can be combined in a conventional manner. In particular, the elastomer, resins, plasticizers, and the filler are typically softened by heating and then mixed for a time sufficient to insure a homogenous mass. The mass can be formed into slabs, or pellets and allowed to cool before use in making chewing gum. Alternatively, the molten mass can be used directly in a chewing gum making process.

Typically, the gum base constitutes between about 5 to about 95 percent by weight of the gum. More preferably the insoluble gum base comprises between 10 and 50 percent by weight of the gum and most preferably about 20 to about 35 percent by weight of the gum.

In general, a chewing gum composition typically comprises a water soluble bulk portion added to the water insoluble chewable gum base portion. The flavoring agents are typically water insoluble. The water soluble portion dissipates with a portion of the flavoring agent over a period of time during chewing, while the bum base portion is retained in the mouth throughout the chew.

The water soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in the chewing gum.

Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination. Nonsugar sweeteners can include sorbitol, mannitol, and xylitol.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent is typically added with the final portion of the bulking agent.

The entire mixing procedure typically takes about fifteen minutes, but longer mixing times may sometimes be required. Those skilled in the art will recognize that many variations of the above-described procedure may be followed.

When the flavor releasing structures are added to chewing gum they will gradually release the flavoring agent as the gum is chewed. The rate at which the flavor agent is released can be varied by varying the ratio of thermoplastic to non-thermoplastic support material. For example, in uncoated cores having about 20% silica the release rate of the flavor agent will be constant for some ten minutes of chewing. On the other hand, in uncoated cores having about 33% silica, a large release of flavor occurs in the first minutes of chewing, gradually decreasing at about 3 to 5 minutes, with a subsequent increase in the release of flavor at about 10 minutes of chewing. This can be contrasted with the normal manner of addition of flavoring agents to chewing gum in which the early rapid release of flavor occurs but without any subsequent increase. It is theorized that more of the flavor is in the thermoplastic matrix in the 20% silica core than in the 33%. Additionally, changing the type of materials in the core may change the release rate of the fibers.

Coating the cores alters the flavor releasing rate, especially during the first minutes of chewing. Cores coated with Starwax 100 showed no flavor release at all during the first three to five minutes of chewing. Cores coated with a white paraffin wax, WP 135, having a melting point range of 135° F., showed flavor release at around the first minutes of chewing.

The following examples are illustrative of embodiments of the invention:

EXAMPLE 1

A mixture of 60% by weight Klucel ® HF and 40% by weight Sipernat 22 were extruded through a die having four holes each with a 4 mm diameter. The extruder had five temperature zones including the die. The first through fourth zones were at about 84° C., 143° C., 231° C. and 239° C. respectively. The die was at about 214° C. The extrudate was then ground to form cores that would pass through a 40 mesh screen. The cores were then loaded with 33.3% by weight of a spearmint oil flavoring agent based on the total weight of the core and flavoring agent. The flavoring agent contained 10% by weight $S_iO_2$ (based on total weight of flavoring agent). To assure even distribution of the flavoring agent in the cores it was added by using a Vee mixer. The cores were then coated with Starwax 100 (a microcrystalline wax having a melting point range of about 200° F.) by a rotating disk coater, in which a ratio of about 1 to 1 cores to wax was used. Both materials were pumped into the rotating disk at about the same rate. This resulted in about less than 3% unloaded wax beads. The coated cores were then sieved through a 40 mesh screen and then a 325 mesh screen. The particle sizes between these screen sizes were retained. This resulted in particles that were smaller than about 850$\mu$, which were then incorporated into a chewing gum having the following composition.

| Weight % of Total | |
|---|---|
| 20.68 | Base |
| 0.96 | Glycerin |
| 10.15 | Dextrose |
| 16.86 | Corn Syrup |
| 4.83 | flavor releasing structures |
| 46.52 | sugar |

This formulation contained about 0.56% by weight flavoring agent based on the total weight of the gum.

EXAMPLE 2

A mixture of 60% by weight Klucel ® EF and 40% by Sipernat 22 were extruded through a die having 2 holes each with a 3 mm diameter. The extruder had six temperature zones including the die. The first through fifth zones were at about 42° C., 70° C., 75° C., 55° C. and 85° C. respectively. The die was at about 139° C. The extrudate was then ground to form cores that would pass through a 40 mesh screen. The cores were then loaded with 33.3% by weight of a spearmint oil flavoring agent based on the total weight of core and flavor. The flavoring agent contained 1% by weight $S_iO_2$ (based on the total weight of flavoring agent). To assure even distribution of the flavoring agent in the cores it was added by using a Vee mixer. The cores were then coated with StarWax 100 (a microcrystalline based wax having a melting point range of about 200° F.). The cores were coated by a rotating disk coater, in which the cores and wax were added to the coater at about a 1 to 1 ratio and at about the same feed rate. The coated cores were then coated a second time with Starwax 100. The twice coated cores were then sieved through a 40 mesh screen and then a 325 mesh screen. The particle sizes between these screen sizes were retained. The resulting particles were smaller than about 850μ and were incorporated into chewing gum having the following composition:

| Weight % of Total | |
|---|---|
| 20.68 | Base |
| 0.96 | Glycerin |
| 10.15 | Dextrose |
| 16.86 | Corn Syrup |
| 10.69 | flavor releasing structures |
| 40.66 | sugar |

This formulation contains about 0.56% flavoring agent, based on the total weight of the gum.

Figure 2:
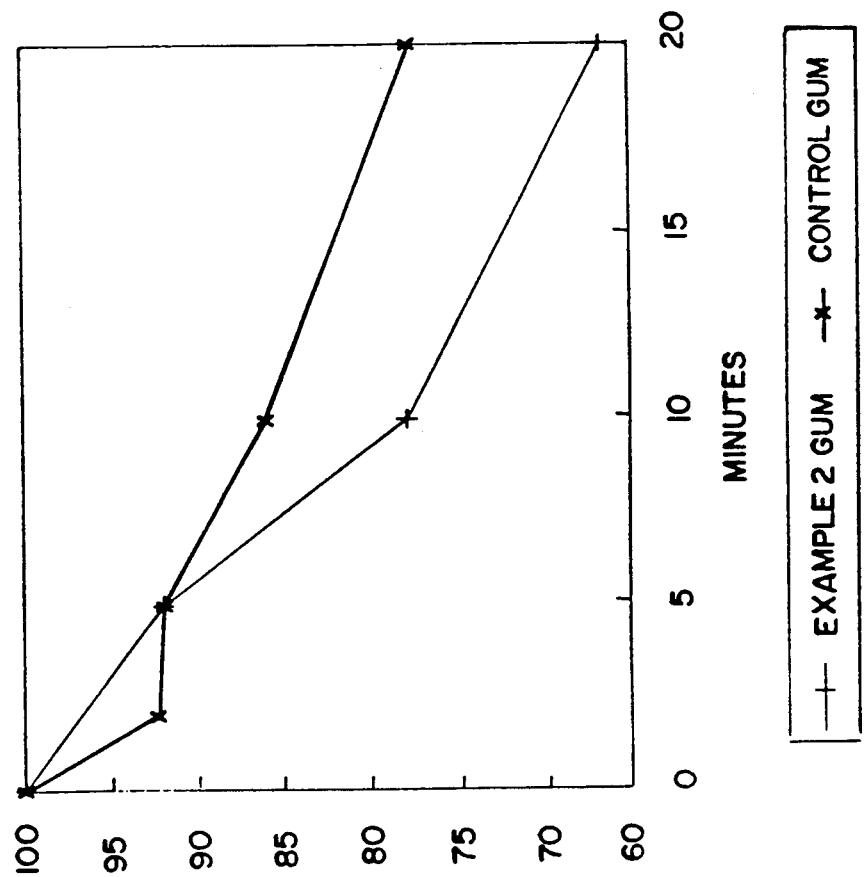
FIG. 2 is a graph plotting the % flavoring agent retained in a gum cud against the minutes of chewing for an embodiment of the present invention and a control gum.

The gums of examples one and two were then compared to a control gum. The control gum had a similar formulation to that in the examples and contained about 0.56% by weight flavoring agent (based on the total weight of the gum). The flavoring agent, however, was not contained in flavor releasing structures, but was mixed directly into the gum. The gums were chewed by five people and the cuds collected a various time intervals. The cuds were chemically analyzed to determine the amount of flavoring agent that remained in the gum. The data that was obtained is set out in FIGS. 1, 1a, 2 and 2a. This data represents the average of the five cuds at a particular point in time. This data shows that the flavor releasing structures provided superior flavor release during the later stages of chewing.

We claim:

1. A chewing gum having a flavor releasing composition which comprises:
   a gum base;
   a water soluble bulk portion; and,
   a flavor releasing composition which comprises a cellulosic material, a silica and a flavoring agent; wherein the silica is dispersed throughout and bound by the cellulosic material and the flavoring agent is releasably retained by the silica.

2. The chewing gum of claim 1 wherein the cellulosic material comprises hydroxypropylcellulose.

3. The chewing gum of claim 1 wherein the flavor releasing composition further comprises a flavor barrier coating encompassing the cellulosic, silica and flavoring agent.

4. The chewing gum of claim 1 wherein the flavoring agent comprises at least 25 percent by weight of the total weight of the flavor releasing composition.

5. The chewing gum of claim 1 wherein the flavoring agent comprises at least 33 percent by weight of the total weight of the flavor releasing composition.

6. A chewing gum having a flavor releasing extrudate which comprises:
   a gum base;
   a water soluble bulk portion; and,
   a flavor releasing extrudate having a particle size capable of passing through about a 40 mesh screen, said extrude comprising a cellulosic material and a flavor reservoir material including a flavoring agent releasably retained thereby; wherein the flavor reservoir material is dispersed throughout and bound by the cellulosic material.

7. The chewing gum of claim 6 wherein the flavor reservoir material comprises a silica.

8. The chewing gum of claim 6 wherein the cellulosic material comprises hydroxypropylcellulose.

9. The chewing gum of claim 6 wherein the flavor releasing extrudate is coated with a flavor barrier coating.

10. The chewing gum of claim 6 wherein the flavoring agent comprises at least 25 percent by weight of the total weight of the flavor releasing extrudate.

11. The chewing gum of claim 6 wherein the flavoring agent comprises at least 33 percent by weight of the total weight of the flavoring agent.

12. A chewing gum having a flavor releasing structure which comprises:
   a gum base;
   a water soluble bulk portion; and,
   a flavor releasing structure in the shape of a small particle, said structure comprising:
   a thermoplastic material;
   a non-thermoplastic material dispersed throughout and bound by said thermoplastic material;
   a flavoring agent comprising at least 25 percent by weight of the total weight of the flavor releasing structure, and being releasably retained by said non-thermoplastic; and,
   a flavor barrier coating encompassing said thermoplastic, non-thermoplastic and flavoring agent.

13. The chewing gum of claim 12 wherein the thermoplastic material comprises a cellulosic material.

14. The chewing gum of claim 12 wherein the thermoplastic material comprises hydroxypropylcellulose.

15. The chewing gum of claim 12 wherein the non-thermoplastic material comprises a silica.

* * * * *

UNITED STATES PATENT AND TRADEMARK OFFICE
CERTIFICATE OF CORRECTION

PATENT NO. : 5,128,155
DATED : July 7, 1992
INVENTOR(S) : Joo H. Song et al.

It is certified that error appears in the above-identified patent and that said Letters Patent is hereby corrected as shown below:

ON THE TITLE PAGE

Under the heading "Foreign Patent Documents", in the eighth line, delete "WO88/02703" and substitute therefor --WO89/02703--.

Column 1, line 8, delete "flavor-releasing" and substitute therefor --flavor releasing--.

Column 2, line 41, delete "cores" and substitute therefor --core's--.

Column 4, line 28, delete "mists" and substitute therefor --mist--.

Column 4, line 48, delete "then" and substitute therefor --than--.

Column 5, line 34, delete "orabic" and substitute therefor --arabic--.

Column 6, line 8, delete "form" and substitute therefor --from--.

Column 6, line 67, delete "bum" and substitute therefor --gum--.

UNITED STATES PATENT AND TRADEMARK OFFICE
CERTIFICATE OF CORRECTION

PATENT NO.  :   5,128,155
DATED       :   July 7, 1992
INVENTOR(S) :   Joo H. Song et al.

It is certified that error appears in the above-identified patent and that said Letters Patent is hereby corrected as shown below:

Column 7, line 38, delete "is" and substitute therefor --are--.

Column 8, line 49, delete "were" and substitute therefor --was--.

Column 9, line 26, delete "a" and substitute therefor --at--.

Column 10, line 13, claim 6, delete "extrude" and substitute therefor --extrudate--.

Signed and Sealed this

Thirty-first Day of May, 1994

Attest:

BRUCE LEHMAN

*Attesting Officer*   Commissioner of Patents and Trademarks